UNITED STATES PATENT OFFICE.

PROSPER JEAN AUGUSTE MAIGNEN, OF PHILADELPHIA, PENNSYLVANIA.

ANTISEPTIC.

1,086,193. Specification of Letters Patent. Patented Feb. 3, 1914.

No Drawing. Continuation of application Serial No. 486,334, filed March 29, 1909. This application filed September 18, 1913. Serial No. 790,399.

*To all whom it may concern:*

Be it known that I, PROSPER JEAN AUGUSTE MAIGNEN, a citizen of France, and resident of Philadelphia, in the State of Pennsylvania, have invented a certain new and useful Improvement in Antiseptics, whereof the following is a specification.

It is the object of my invention to provide means for destroying bacteria inhabiting living tissue, without injuring the latter, by progressively evolving sodium hydroxid contiguous to said tissue, from and in a moist mixture of calcium hydroxid, sodium carbonate, aluminum sulfate and boric acid, which, with the products of their reaction, limit and control the action of said evolved sodium hydroxid; whereby albuminous proteid bacterial substance and purulent matter are dissolved without deleterious effect upon contiguous healthy tissue. Said process is the subject matter of my copending application Serial 778,428 filed July 11, 1913 which is a division of my application Serial 486,334, filed March 29, 1909, of which this application is a continuation; the claims of this application being limited to a composition of matter used in said process, as hereinafter described.

The means for progressively evolving sodium hydroxid, in accordance with my invention, include a primarily dry powdered mixture of a calcium hydroxid, sodium carbonate, boric acid and aluminum sulfate, which may be mixed in various proportions. Said substances are capable of existing, in dry mixture, without chemical reaction upon each other, but in the presence of moisture, for instance, water or blood-serum, react upon each other with the result above described. However, substances of equivalent characteristics may be employed. For instance, calcium oxid, soda-ash, boric acid and alum. It is also to be understood that in some cases it is desirable to omit one or the other of said substances, while in other cases I may add to the mixture some inert substance, incapable of destroying the active principles of the chief ingredients aforesaid. For instance, when a wound has been sterilized by the full strength mixture it may be desirable to fill the cavity with a dusting powder of less active power, as a dressing, in which case the original mixture may be diluted with an equal weight of calcium carbonate or other inert substance, which has no other effect in the premises than to act as a vehicle and diluent for the remedy. In preparing my remedy for dental purposes I prefer to dilute the mixture with three times its weight of calcium carbonate or other such inert substances.

I have discovered by microscopical investigation that said remedy has the property of separating the albuminous (proteid) matter, from the nuclei of the microörganisms. The albuminous matter being thus separated it can be seen with the microscope that the nuclei break away into separate units, which, bacteriological tests show to be absolutely lifeless and incapable of growth or reproduction. I have found by experimentation upon myself and others that said remedy has a similar disintegrating effect upon the broken down tissues, and that it transforms the individual pus cells of a wound into a plastic viscous substance resembling white of egg, which leaves the wound easily and completely. I have also found that said remedy has absolutely no deleterious effect upon healthy tissues whether they are in the immediate proximity of the injured part or away from it. On the contrary it has a distinctively beneficial bio-chemical or tonic influence on the healthy tissues which surround the injured part. Therefore, said remedy may be applied with particular advantage wherever there is a lesion exposed to bacterial infection or already infected. Said mixture may be applied to the injured tissues, either as a dry powder or as an aqueous mixture at various degrees of dilution, in accordance with the location and nature of the injury. For application to the air passages in the throat, nose and lungs in cases of pulmonary phthisis, pneumonia, catarrh and other infections so located that the air alone can be used as a vehicle to reach the injured part, the mixture in the form of dry powder may be diluted by air, in which it is agitated in any convenient manner and inhaled. Thus applied the fine particles of the mixture settle upon the injured tissues. The moisture from the latter dissolves the soluble part of the mixture. The nascent products which result from this reaction or ionization as well as the suspended residue of the elements themselves combine to destroy the bacteria, and dry up and sterilize the part as above described. Said antiseptic may also be used as an aqueous mixture in proportions varying from one-half to five per cent. of the active elements, according to the nature, condition and location of the injured tissues. The weakest aqueous mixture may be employed when dealing with delicate tissues, nasal, labial, conjunctival and other sensitive membranes; the strongest aqueous mixture may be employed for serious injuries such as ulcers, abscesses and cancerous growths. The one per cent. aqueous mixture may be considered a normal solution and employed for injuries to the alimentary canal and skin disorders.

I do not desire to limit myself to the precise proportions or methods of application of my remedy above described, as it is obvious that various modifications may be made therein without departing from the essential features of my invention as defined in the appended claims.

I claim:—

1. An antiseptic including a mixture of calcium hydroxid, aluminum sulfate, sodium carbonate and boric acid.

2. An antiseptic including a mixture of calcium hydroxid, aluminum sulfate, sodium carbonate and boric acid as a dry powder.

In testimony whereof, I have hereunto signed my name at Philadelphia, Pennsylvania, this tenth day of September, 1913.

PROSPER JEAN AUGUSTE MAIGNEN.

Witnesses:
ARTHUR E. PAIGE,
ANNA ISRAELVITZ.